Figures 5, 6:
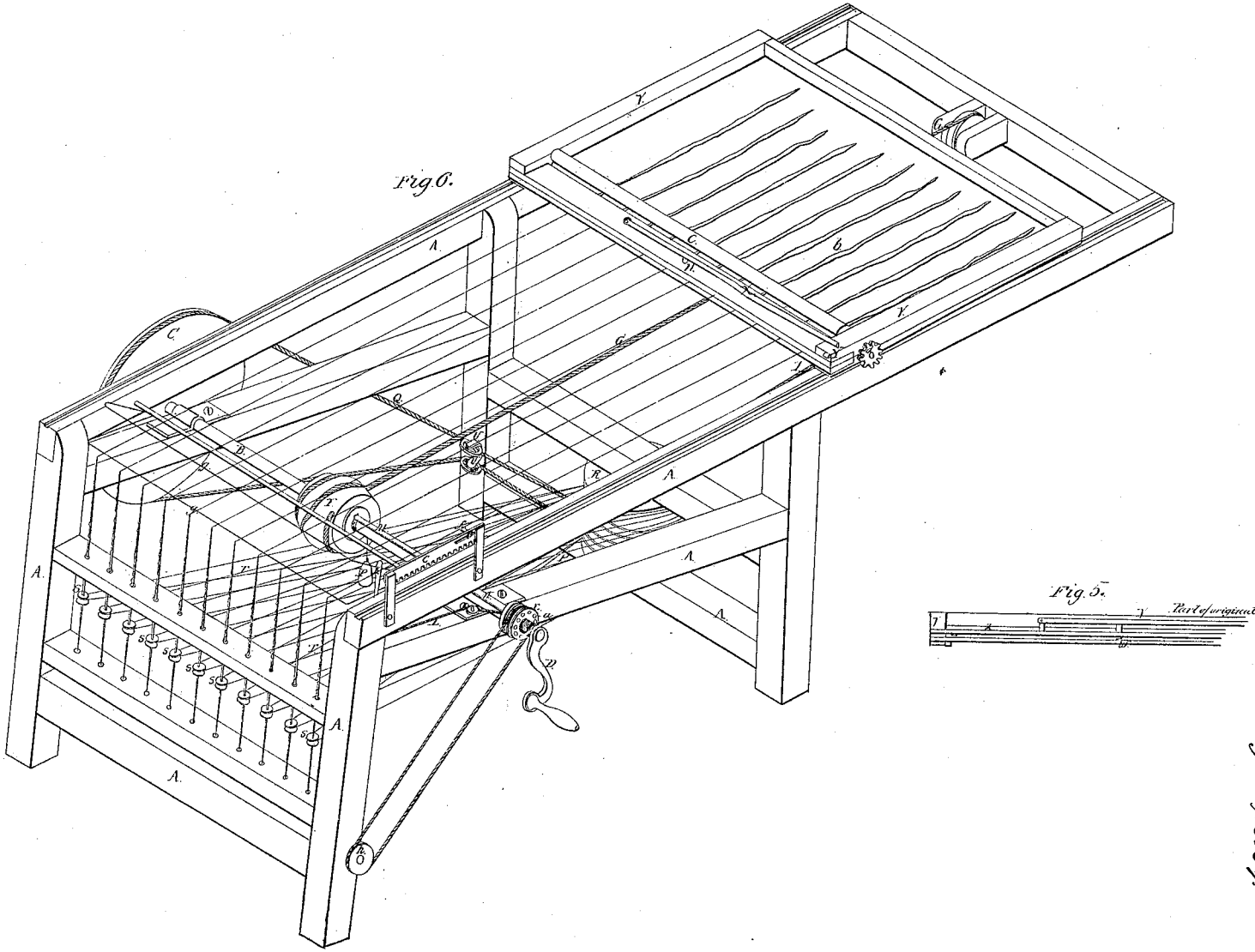

5612X
Sheet 1, 3 Sheets.
W. Allen.
Wool Spinner.
Patented Aug. 15, 1829.
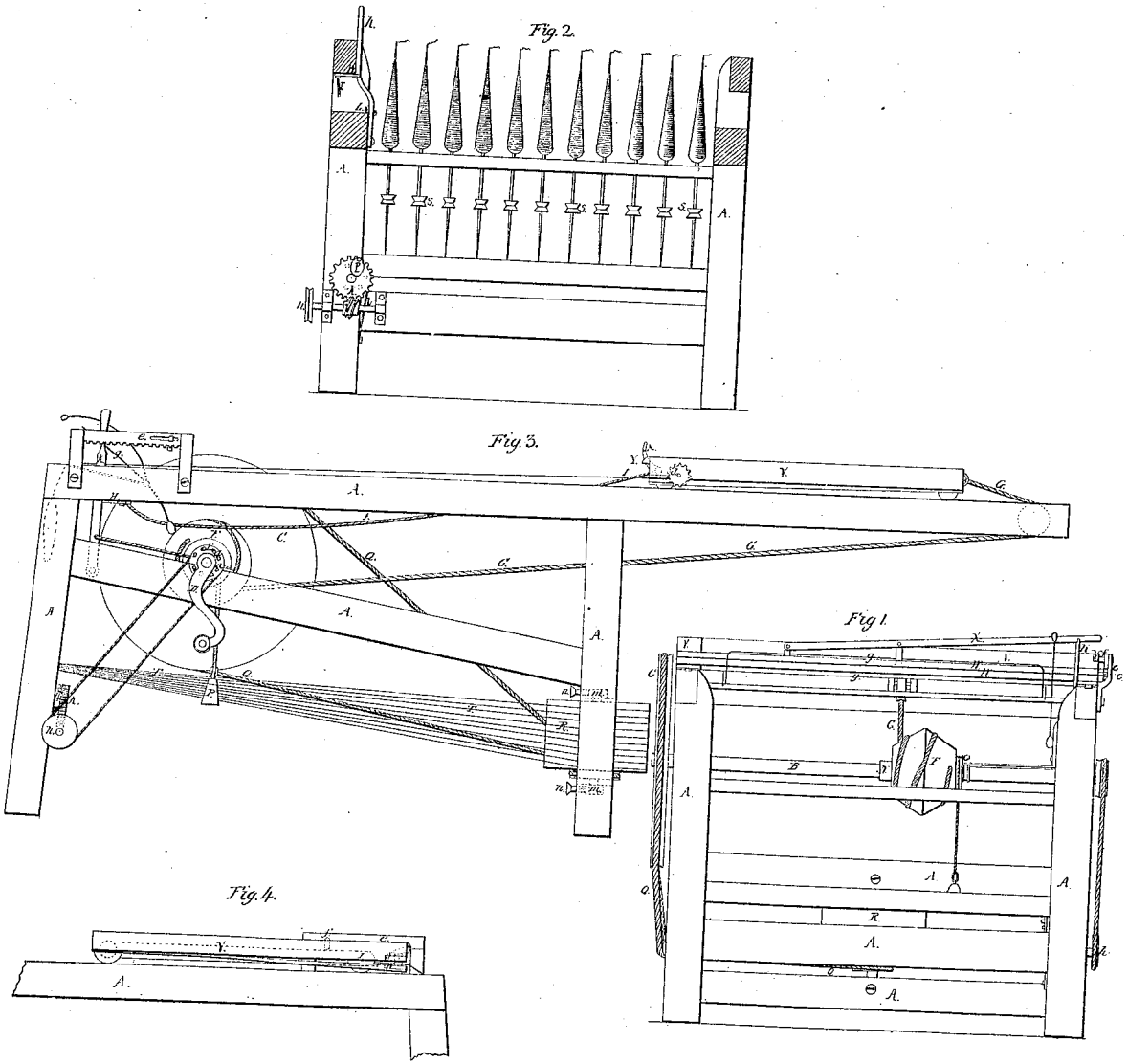
N. PETERS, PHOTO-LITHOGRAPHER, WASHINGTON, D. C.

o Printed Specification Available

5612X

W. Allen.

Sheet 2, 2 Sheets.

Wool Spinner.

Patented Aug. 15, 1829.

N. PETERS, PHOTO-LITHOGRAPHER, WASHINGTON, D. C.

United States Patent Office

PTO - BOYERS, PA Duty Station

MISSING PAGE TEMPORARY NOTICE

PATENT # 5612X FOR ISSUE DATE 8-15-1829

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All Text

Data Conversion Operation

Boyers, Pa